(12) United States Patent
Mahadevan et al.

(10) Patent No.: US 8,965,894 B2
(45) Date of Patent: Feb. 24, 2015

(54) AUTOMATED WEB PAGE CLASSIFICATION

(75) Inventors: Indra Devi Mahadevan, Tamil Nadulndia (IN); Selvakuberan Karuppasamy, Tamil Nadulndia (IN)

(73) Assignee: Tata Consultancy Services Limited (IN)

( * ) Notice: Subject to any disclaimer, the term of this patent is extended or adjusted under 35 U.S.C. 154(b) by 326 days.

(21) Appl. No.: 12/974,355

(22) Filed: Dec. 21, 2010

(65) Prior Publication Data
US 2012/0158724 A1    Jun. 21, 2012

(51) Int. Cl.
*G06F 17/30* (2006.01)
(52) U.S. Cl.
CPC ............................. *G06F 17/30873* (2013.01)
USPC ........................................................ 707/737
(58) Field of Classification Search
None
See application file for complete search history.

(56) References Cited

U.S. PATENT DOCUMENTS

| | | | | |
|---|---|---|---|---|
| 6,915,482 | B2* | 7/2005 | Jellum et al. | 715/234 |
| 7,181,438 | B1* | 2/2007 | Szabo | 1/1 |
| 7,284,008 | B2* | 10/2007 | Henkin et al. | 1/1 |
| 7,836,085 | B2* | 11/2010 | Petakov et al. | 707/793 |
| 8,078,625 | B1* | 12/2011 | Zhang et al. | 707/748 |
| 2002/0178394 | A1* | 11/2002 | Bamberger et al. | 714/1 |
| 2007/0276822 | A1* | 11/2007 | Bush | 707/5 |
| 2008/0040313 | A1* | 2/2008 | Schachter | 707/2 |
| 2009/0006285 | A1* | 1/2009 | Meek et al. | 706/12 |
| 2009/0089652 | A1* | 4/2009 | Chi et al. | 715/205 |
| 2009/0100036 | A1* | 4/2009 | Bedrax-Weiss et al. | 707/5 |
| 2009/0234794 | A1* | 9/2009 | Harrison | 706/54 |
| 2009/0240638 | A1* | 9/2009 | Kirpal et al. | 706/12 |
| 2009/0327264 | A1* | 12/2009 | Yu et al. | 707/5 |
| 2010/0082590 | A1* | 4/2010 | Nye | 707/706 |
| 2010/0088299 | A1* | 4/2010 | O'Sullivan et al. | 707/705 |
| 2010/0106672 | A1* | 4/2010 | Robson et al. | 706/50 |
| 2011/0078157 | A1* | 3/2011 | Sun et al. | 707/749 |

OTHER PUBLICATIONS

Lawrence and Giles, "Context and Page Analysis for Improved Web Search," 1998, IEEE, IEEE Internet Computing Jul.-Aug. 1998, pp. 38-46.*
Sun et al. "Web Classification Using Support Vector Machine," 2002, ACM, WIDM'02 Nov. 4-9, 2002.*
Kan, "Web page categorization without the web page," 2004, ACM, WWW2004, May 17-22, 2004.*
Bjork, Kaj-Mikael, "A Review of Some State-of-the-Art Contributions Relevant to Production-Distribution Networks and Supply Chain Flexibility", Journal of Information, Intelligence and Knowledge, vol. 2, Issue 3, (2010), 90 pgs.

* cited by examiner

*Primary Examiner* — Robert Beausoliel, Jr.
*Assistant Examiner* — Richard Bowen
(74) *Attorney, Agent, or Firm* — Schwegman Lundberg & Woessner, P.A.

(57) ABSTRACT

Described herein are methods and systems implementing a web page classification system for automatically generating at least one context feature for a web page and classifying the web page based on the at least one context feature. In one implementation, a context feature generating module of the web page classification system is configured to automatically generate at least one context feature based on at least two of uniform resource locator (URL) features, title features, and meta tags features of a web page and a classifying module is configured to classify the web page based on the at least one context feature.

9 Claims, 3 Drawing Sheets

AUTOMATED WEB PAGE CLASSIFICATION

TECHNICAL FIELD

The present subject matter relates, in general, to web page classification and in particular, to automatically generating context features for web page classification.

BACKGROUND

The internet has become indispensable in many aspects of our lives. The importance of the Internet lies in providing users access to an enormous amount of data related to almost any conceivable subject. The amount of data available on the Internet is enormous and the enormity of data has its own disadvantages. A major disadvantage being difficulty in finding relevant information from the enormous amount of the data. Generally, tools like search engines assist users in locating information on the Internet. However, the search engines generally provide the users with a large number of web pages in response to keywords provided by the user.

To find web pages that may be relevant to a given keyword, various techniques have been developed. One such technique is web page classification. Web page classification attempts to classify web pages available on World Wide Web (the web) under appropriate categories. Conventionally, web page classification may be performed manually or automatically, such as performed by search engines. Once such classification is done, the web pages may be identifiable through such classification. On the other hand, manual web page classification may be difficult and time consuming technique in cases where volume of data available on the web is enormous.

Further, the web pages are heterogeneous in nature thus making the classification complex. For example, the web pages may be unstructured documents like text document, semi structured documents like HyperText Markup Language (HTML) files, or fully structured documents like Extensible Markup Language (XML) file. The web pages may also contain files of various formats, such as image files, audio files, and video files. Thus the distinct varieties of the web pages may pose a challenge in web page classification.

SUMMARY

The subject matter described herein relates to a system and method for automatically classifying web pages, which are further described below in the detailed description. This summary is not intended to identify essential features of the claimed subject matter nor is it intended for use in determining or limiting the scope of the claimed subject matter.

In accordance with one embodiment of the subject matter, a web page classification system for automatically generating context features for web pages and classifying the web pages based on the automatically generated context features is implemented. The web page classification system includes a context feature generating module configured to generate at least one context feature for the web page, wherein the at least one context feature includes at least two of uniform resource locator (URL) features, title features, and meta features; and a classifying module for classifying the web page based on the generated at least one context feature.

BRIEF DESCRIPTION OF DRAWINGS

The above and other features, aspects, and advantages of the subject matter will be better understood with regard to the following description, appended claims, and accompanying figures. In the figures, the left-most digit(s) of a reference number identifies the figure in which the reference number first appears. The use of the same reference number in different figures indicates similar or identical items.

DETAILED DESCRIPTION

Figure 1:
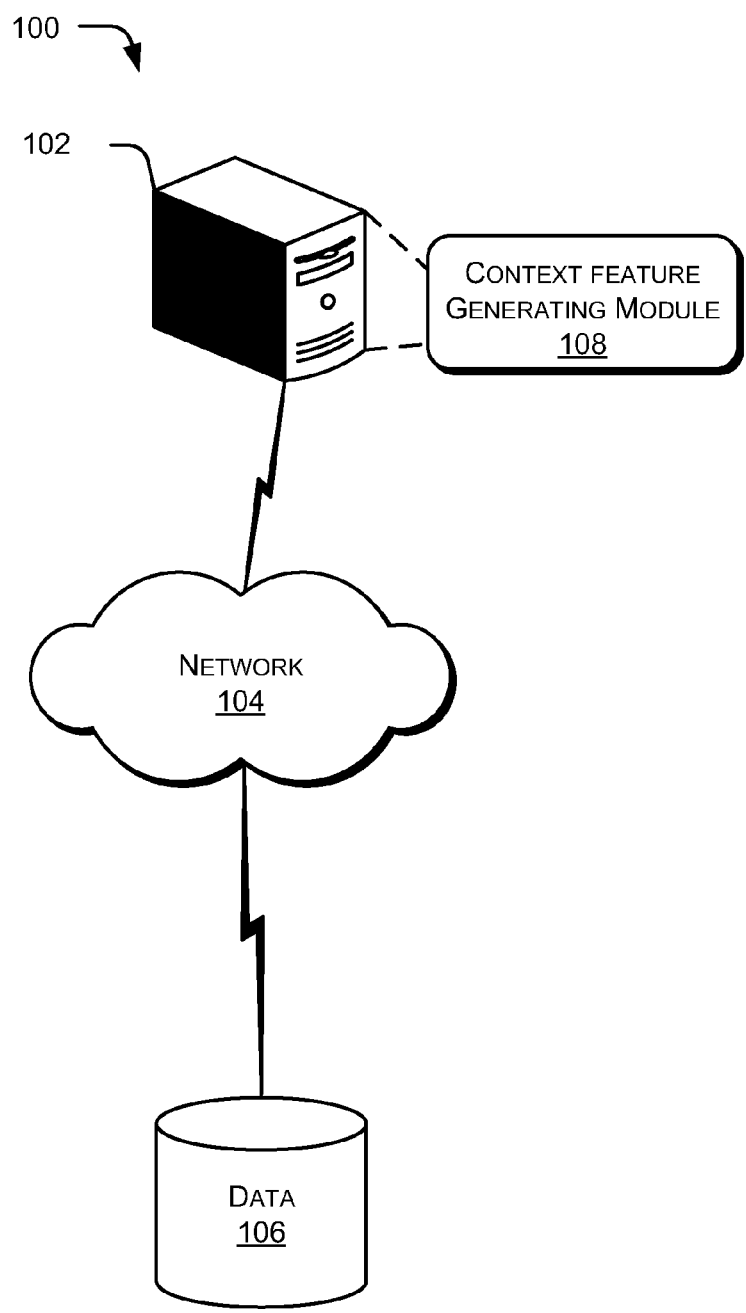
FIG. 1 illustrates a network environment for implementing a web page classification system, in accordance with an embodiment of the present subject matter.

The present subject matter relates to systems and methods for web page classification.

Web page classification is a technique used to classify documents, such as the web pages available on World Wide Web (the web) under appropriate categories. Web page classification is used by searching tools, such as search engines to search and provide data relevant to a keyword search made by a user looking for some particular information on Internet.

Most of the web pages today are created using markup languages including but not limited to HyperText Markup Language (HTML) and eXtensible HyperText Markup Language (XHTML). For improving web page representation, HTML structure of a web page is exploited. This helps in identifying more representative terms of the web page. A web page can be represented using several elements of the web page including the body part of a web page (BODY), the title of a web page (TITLE), section headings (H1~H6), emphasized content (EM), uniform resource locator (URL), and/or meta description of a web page (meta tags). URLs are hyperlinks that may contain descriptors for the linked web pages. If keywords can be extracted from a URL, these keywords are relatively important. Meta tags describe meta description of a web page and are generally invisible to users, but it may provide description, keywords, and date for a web page. A term enclosed within the tags: <title> and </title> in a source code of a web page represents the title of the web page and is generally more representative of the topic of the web page than a term enclosed within the tags: <body> and </body> that represents the content of the web page.

In the web page classification technique, the search engines generally classify a web page based on metadata associated with the web page. Metadata may be defined as structured data that supports functions associated with a designated object, for example, tables and structures used in a web page. Metadata may include terms; meta tags etc. occurring in the web pages. Generally, the metadata for the web pages is stored in the form of HTML meta tags that may be used by search engines for classifying the web pages. However, the meta tags usually lack consistency and may also be misused by a web page author to increase the chances of surfacing the web page in web searches. Moreover, web pages typically do not contain meta tags.

As most of the current web pages do not contain any meta tags provided by the web page authors, thus web page classification using the meta tags is typically not performed by the search engines. Although, human experts can easily identify the metadata in a web page but the number of web pages and the expertise needed to classify all type of web pages make it difficult to generate metadata manually. Thus, web page classification is usually performed using at least the content features.

Another approach described in conventional systems for automated web page classification is using uniform resource locator (URL) of the web pages. Web page classification using only the URL provides a faster method as compared to typical web page classification using the content features, as the web pages do not have to be fetched and analyzed. However the classification accuracy is not very high since URL alone is used to classify the web pages.

The present subject matter discloses systems and methods for automatically generating context features for the web pages and using the context features to classify the web pages. A web page classification system, according to the present subject matter, generates the context features for the web page by evaluating a substantially small portion of the web page and stores the contextual features as metadata to be used by search engines. The web page classification system, hereinafter referred to as the system, according to the present subject matter improves web page classification accuracy significantly.

According to one embodiment of the present subject matter, the context features considered for web page classification includes URL, title or meta tags associated with the web pages. These features can be retrieved quickly as there is no need to process the body of the XHTML/HTML documents to retrieve these features. This approach reduces the memory/computational resources requirements. The context features for a web page are generated by evaluating a substantially small portion of the web page that may include the URL, title or meta tags associated with the web page. Accordingly, the context features generation for the web page requires reduced amount of time.

The context features generated for a web page are specific for the given web page, therefore, the context features can be used to find a category to which the web page may belong. Further, the context features can be used to find another category to which the web page may associated with.

In one embodiment of the present subject matter, the web page classification system retrieves the URL of the web page to be classified. The web page classification system generates tokens from the retrieved URL. The tokens are generated by checking delimiters, such as punctuation symbols in the URL. Any string between the delimiters is considered as a token. All the URLs contain words like http, www, .htm or .html which are not useful for classification and therefore the generating module disregards such common words from the token list. The generated tokens resulted from the retrieved URL are stemmed using any conventional stemming algorithm, for example, Poter's stemming algorithm. The stemming of the tokens generates root words of the tokens which are called as URL features. Similarly, title features are generated by extracting the tokens from the title and applying stemming to find the tokens.

Further, the web page is checked to determine whether it contains meta tags. If so, the generating module generates meta features by using information stored using the meta tags and applying stemming to the meta tags. The generating module combines the URL features, the title features and the meta features. The generating module further checks for redundancy and removes redundant features. Also, the generating module stores the context features as the metadata of the web page. The classifying module retrieves the metadata and classifies the web page on the basis of the metadata. The classifying module performs web page classification using machine learning techniques, for example, Bayesian classification.

According to one embodiment of the present subject matter, other tags like anchor, table, and frame which also contain descriptive information about the category of the web page may be processed. In said embodiment, web structure mining techniques may be applied to find additional informative features of the web page.

The following disclosure describes systems and methods for web page classification using a web page classification system. While aspects of the described systems and methods can be implemented in any number of different computing systems, environments, and/or configurations, embodiments for the web page classification system are described in the context of the following exemplary system(s) and method(s).

It will be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" is used throughout for clarity of the description and can include either a direct connection or an indirect connection.

FIG. 1 illustrates network environment 100 implementing a web page classification system 102 for automatically generating metadata for web page classification, according to an embodiment of the present subject matter. The network environment 100 includes data 106, for example, that may be stored on the World Wide Web, in communication with the web page classification system 102 through a network 104. Communication links between the data 106 and the web page classification system 102 are enabled through a desired form of communication, for example, via dial-up modem connections, cable links, digital subscriber lines (DSL), wireless or satellite links, or any other suitable form of communication.

The network 104 may be a wireless network, a wired network, or a combination thereof. The network 104 can also be an individual network or a collection of many such individual networks, interconnected with each other and functioning as a single large network, e.g., the Internet or an intranet. The network 104 can be implemented as one of the different types of networks, such as intranet, local area network (LAN), wide area network (WAN), the internet, and such. The network 104 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 104 may include network devices, such as network switches, hubs, routers, HBAs, for providing a link between the web page classification system 102 and the data 106. The network devices within the network 104 may interact with the web page classification system 102 and the data 106 through communication links.

The web page classification system 102 may be any computing device connected to the network 104. For instance, the web page classification system 102 may be implemented as mainframe computers, workstations, personal computers, desktop computers, hand-held devices, multiprocessor systems, personal digital assistants (PDAs), laptops, network computers, minicomputers, servers and the like. In addition, the web page classification system 102 may include multiple servers to perform mirrored tasks for users, thereby relieving congestion or minimizing traffic. The data 106 and the web page classification system 102 both include computer readable data storage media, such as hard disk drives and RAM memory, which store program instructions and data.

The web page classification system 102 accesses data 106 through the network 104. The data 106 is usually stored on the World Wide Web but may also be stored elsewhere such as on a server internal to an organization or may be available from in one more data repository from different sources. The data 106 is accessed and stored as web pages data for generating the context features. The web page classification system 102 uses three types of data, namely URL, title, and meta tags for the classification. URL of a web page is unique for the web page and sometimes provides clue about the category of the web page. Title and meta tags in the XHTML/HTML tags also provide information about the category of the web page.

In one embodiment of the present subject matter, the web page classification system 102 uses XHTML/HTML tags including but not limited to anchor, link, form, and frame to get features that are in the body portion of a XHTML/HTML document.

The web page classification system 102 in accordance with the present subject matter, employs a context feature generating module 108 that may use machine learning methods to generate context features for a given set of web pages. Web content mining may require more resources therefore the web page classification system 102 employs web structure mining techniques. After the generation of the context features, the web pages are classified based on the context features. The web page classification system 102 uses machine learning techniques to build document classifiers. Rather than actually using the document classifiers to categorize individual documents, the web page classification system 102 extracts classification rules from the document classifiers. The classification rules are then transformed into a set of queries that can be sent to a search interface of a text database for example, the data 106. The search interface then may search the text database and provide the number of web pages having context features corresponding to the queries provided by the web page classification system 102. The web page classification system 102 uses the number of matches reported for each query to make classification decisions, without having to retrieve and analyze any of the actual documents stored in the data 106.

Figure 2:
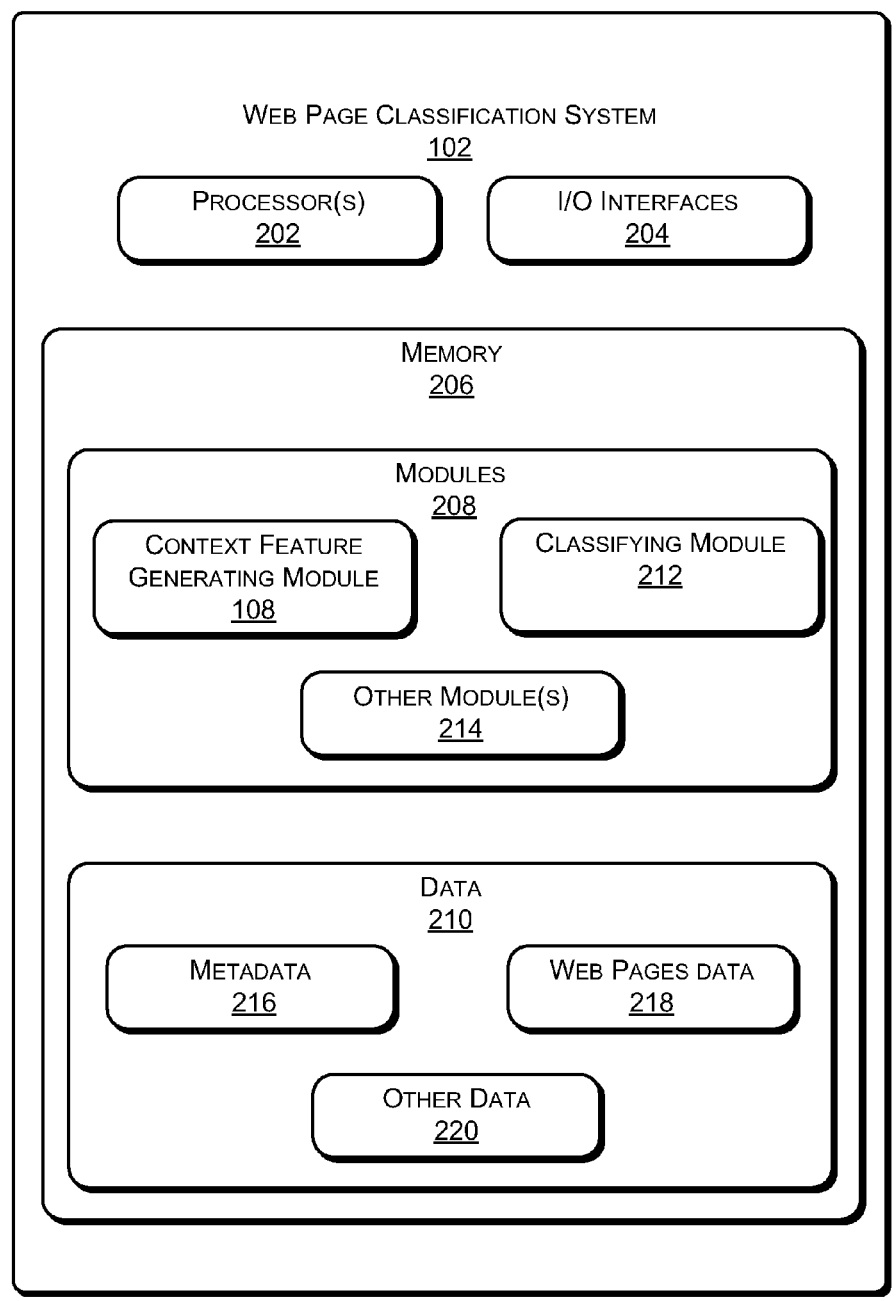
FIG. 2 illustrates the web page classification system, in accordance with an embodiment of the present subject matter.

FIG. 2 illustrates the web page classification system 102 in accordance with one embodiment of the present subject matter. The web page classification system 102 includes processor(s) 202, I/O interfaces 204, and a memory 206.

The processor(s) 202 can be a single processing unit or a combination of multiple processing units. The processor(s) 202 can be implemented as one or more microprocessors, microcomputers, microcontrollers, digital signal processors, central processing units, state machines, logic circuitries, or any devices that manipulate signals based on operational instructions. Among other capabilities, the processor(s) 202 are configured to fetch and execute computer-readable instructions and data stored in the memory 206.

The I/O interfaces 204 may include a variety of software and hardware interfaces, for example, interface for peripheral device(s) such as a keyboard, a mouse, an external memory, a printer, etc. Further, the I/O interfaces 204 may enable the web page classification system 102 to communicate with other computing devices, such as web servers and external databases. The I/O interfaces 204 may facilitate multiple communications within a wide variety of protocols and networks, such as the network 104, including wired networks, e.g., LAN, cable, etc., and wireless networks, e.g., WLAN, cellular, satellite, etc. The I/O interfaces 204 may include one or more ports for connecting the web page classification system 102 to the data 106.

The memory 206 can include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 includes modules 208 and data 210.

The modules 208 include the aforementioned context feature generating module 108 (hereinafter referred to as generating module 108), a classifying module 212, and other module(s) 214. The other module(s) 214, in general, include routines, programs, objects, components, data structures, etc., that perform particular task or implement particular abstract data types and may include programs that supplement applications implemented by the web page classification system 102.

The generating module 108 automatically generates context features for a web page and stores the context features as metadata 216 of the web page. The classifying module 212 retrieves the metadata 216 and classifies the web page on the basis of the metadata 216. In one embodiment, the classifying module 212 is configured to categorize the web page in more than one category.

The data 210 includes the metadata 216 and web pages data 218 and other data 220 in addition to the metadata 216. As described above, the metadata 216 may be defined as structured data that supports functions associated with a designated object. The metadata 216 enables the system 102 to retrieve information in a short duration of time. The context features generated by the generating module 108 are saved in the metadata 216. The web pages data 218 includes data, associated with the web pages to be classified, that might be used by the web page classification system 102 for classifying the web pages. The other data 220 may include any of the instructions, inference rules which might be required for the functioning of the web page classification system 102. For example, the other data 220 might include feature extraction and classification algorithms.

In one embodiment of the present subject matter, the generating module 108 may access a web page stored in the web pages data 218. The generating module 108 then retrieves the URL of the web page and generates tokens from the retrieved URL. In one implementation, the tokens are generated by checking delimiters, such as punctuation symbols in the URL. Any string between the delimiters is considered as a token. Terms like http, www, .htm or .html, commonly include in all the URLs, are not useful for classification and therefore may be discarded from the token list by the generating module 108. The generating module 108 further removes words that appear more than once in the token list. The generated tokens are stemmed using any conventional stemming algorithm, for example, Poter's stemming algorithm. The stemming of the tokens generates root words of the tokens called as URL features. For example, consider a URL 'http://www.tcs.com/careers/Pages/default.aspx'. Here delimiters are ':', '/', and '.'. The words http, www, tcs, com, careers, pages, default and aspx are tokens. The words http, www, com, aspx are common words that occur in many URLs and are not useful for the classification of the web page. Accordingly, the common words are removed from the token list. Further, the words 'careers' and 'pages' may be stemmed to 'career' and 'page' respectively. Therefore the web page classification system 102 may take tcs, career, and page as URL features.

Similarly title features are generated by extracting the tokens from the title of the web pages. Stemming may be performed upon the terms occurring in the title to find the tokens. Further, the web page is evaluated to check whether it contains meta tags. If so, the generating module 108 generates meta features by using information stored using these tags and applying stemming to the meta tags. The generating module 108 combines the URL features, the title features, and the meta features. The generating module 108 further checks for redundancy and removes redundant features. The generating module 108 stores the combined features, called context features, in the metadata 216.

The classifying module 212 retrieves the metadata 216 and classifies the web page on the basis of the metadata 216. The classifying module performs web page classification using machine learning techniques, for example, Bayesian classification. Bayesian methods provide the basis for probabilistic learning methods that accommodate and require knowledge about the prior possibilities of alternative hypotheses and about the probability of observing various data given the hypothesis. Bayesian methods allow assigning a posterior probability to each candidate hypothesis, based on these assumed priors and the observed data. The classifying module 212 may further categorize the web page according to a hierarchical structure.

Figure 3:
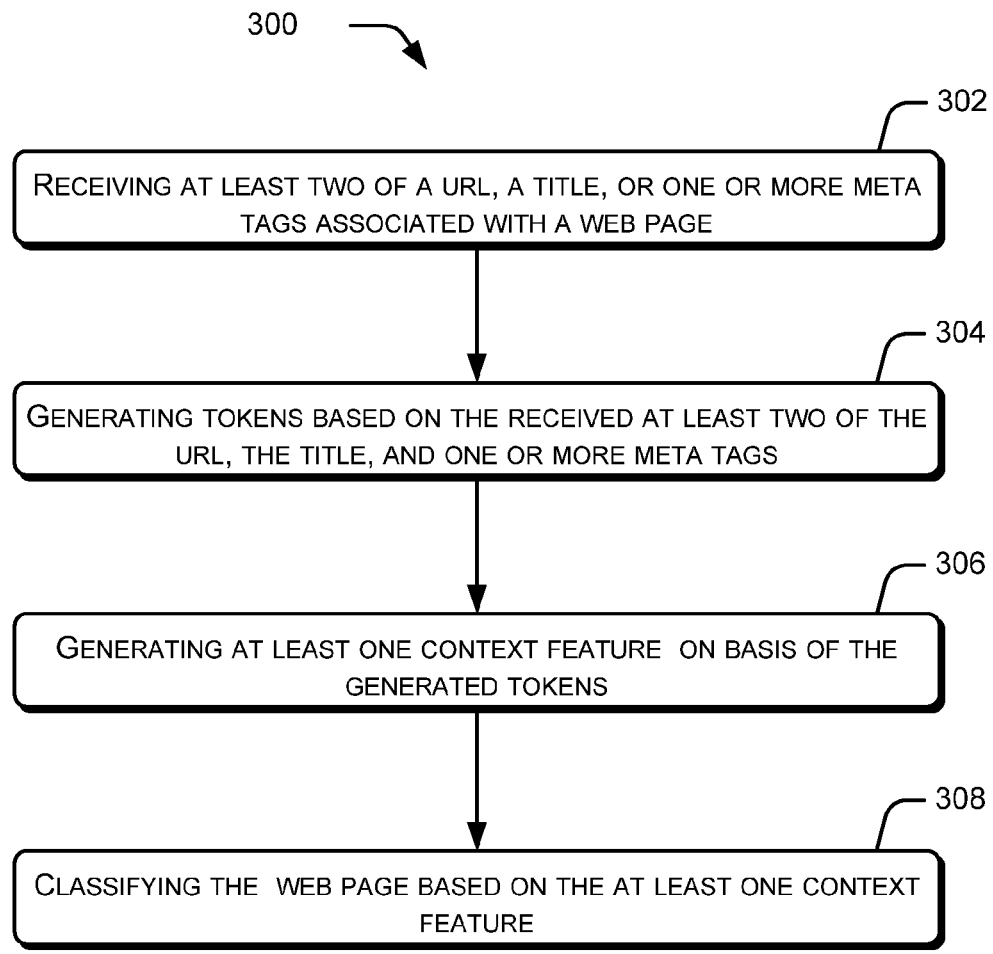
FIG. 3 illustrates a method for classifying web pages, according to an embodiment of the present subject matter.

FIG. 3 illustrates a method for classifying web pages, in accordance with one embodiment of the present subject matter. The exemplary method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof. The method is presently provided for a recovery of mail-items pertaining to a single user. It would be appreciated that the same method can also be implemented for a plurality of users without deviating from the scope of the present subject matter.

At block 302, at least two of a URL, a title or meta tags are associated with a web page. In one embodiment, the generating module 108 of the web page classification system 102 may receive at least two of the URL, title or meta tags associated with a web page. For example, the URL, title or meta tags may be received from the web pages data 218. In one example, the URL, the title or the meta tags may be received in any predefined order, for example, the URL may be received prior to the title and the meta tags.

At block 304, tokens are generated on the basis of at least one of the URL, the title or the meta tags. The generation of tokens includes extraction of the terms useful for the classification. For example, when the URL is received by the generating module 108, several operations are performed on the received URL. For example, the generating module 108 identifies delimiters, like punctuation symbols in the URL. In one embodiment, the identification may be performed by any other suitably configured module which may work in cooperation with the generating module 108. The generating module 108 considers any string between the delimiters as a token and stores it in a token list. A set of predefined words such as, http, www, .htm or .html Words which consistently appear in the URLs are not are not taken into consideration for classification purposes and are removed from the token list. The tokens in the token list are stemmed to generate the roots of the terms. For example, a token 'manifestation' may be stemmed to a root 'manifest'. In one embodiment, the stemming may be performed using Poter's stemming method. In other embodiments, various other stemming techniques may be exploited for the purpose. The roots so generated from the URL features. Similarly, title features and meta features are generated from the title and meta tags respectively.

At block 306, the URL features, the title features and meta features generated at the block 304 are used for generating the context features. In one embodiment, the URL features, the title features, and the meta features are combined for generating at least one context feature. For example, if there are three features generated from the URL, two features are generated from the title of the web page corresponding to the URL, and two features are generated from the meta tags found in the source code of the web page, a total of seven features are generated. The redundant features, if any are removed from the seven features, and the remaining features are the context features. The context features are used to classify the web page. It may be mentioned that at least one context feature is needed to classify the web page. The at least one context feature may be generated from two or more of the URL features, title features, and meta features.

At block 308, the web page is classified on the basis of the at least one context feature. In one embodiment, the classification is done using Bayesian classifier. Bayesian methods provide the basis for probabilistic learning methods that accommodate and require knowledge about the prior possibilities of alternative hypotheses and about the probability of observing various data given the hypothesis. Bayesian methods allow assigning a posterior probability to each candidate hypothesis, based on these assumed priors and the observed data. The web page classification system 102 thus classifies the web pages in a time efficient and accurate manner to create a web page classification data for search engines to operate upon.

The above description has been given in reference to a web page classification system 102 used for classifying web pages but a person skilled in the art would know that the web page classification system 102 can be conveniently used for classifying documents other than web pages.

Although embodiments for web page classification system 102 for classifying web pages have been described in language specific to structural features and/or methods, it is to be understood that the invention is not necessarily limited to the specific features or methods described. Rather, the specific features and methods are disclosed as exemplary embodiments for the web page classification system 102 and methods.

We claim:

1. A web page classification system for classifying a web page, the system comprising:
   a processor;
   a memory coupled to the processor, wherein the memory comprises:
   a context feature generating module to:
      generate a plurality of context features for the web page by evaluating a portion of the web page,
         wherein the portion of the web page consists of a uniform resource locator (URL) of the web page, a title of the web page, and at least one meta tag associated with the web page, wherein the plurality of context features consist of at least one URL feature, at least one title feature, and at least one meta feature which are obtained from the URL of the web page, the title of the web page, and the at least one meta tag associated with the web page, respectively, and wherein the at least one URL feature is obtained from stemming of a plurality of tokens in the URL of the web page, each of the plurality of tokens being a string between predefined delimiters in the URL of the web page, combine the at least one URL feature, the at least one title feature, and the at least one meta feature, determine and remove redundant features from amongst combination of the at least one URL feature, the at least one title feature, and the at least one meta feature, and after the removal of the redundant features, store remaining features as metadata of the web page; and a classifying module to retrieve the stored metadata of the web page and to classify the web page based on the stored metadata of the web page.

2. The system as claimed in claim 1, wherein the web page is an HyperText Markup Language (HTML) or an extensible HyperText Markup Language (XHTML) document.

3. The system as claimed in claim 1, wherein the stored metadata is independent of a category to which the web page previously belonged.

4. The system as claimed in claim 1, wherein the classifying module is configured to categorize the web page according to a hierarchical structure.

5. The system as claimed in claim 1, wherein the classifying module is configured to categorize the web page in more than one category.

6. The system as claimed in claim 1, wherein the context feature generating module uses web structure mining techniques for generating the one or more context feature.

7. A method for classification of a web page, the method comprising:

generating a plurality of tokens by evaluating a portion of the web page,
wherein the portion of the web page consists of a uniform resource locator (URL) of the web page, a title of the web page, and at least one meta tag associated with the web page, and
wherein each of the plurality of tokens is a string between predefined delimiters in at least one of the URL of the web page, the title of the web page, and the at least one meta tag associated with the web page;

combining the stemmed tokens;

determining and removing redundant tokens from the combination of the stemmed tokens;

after the removal of the redundant tokens, storing remaining tokens as metadata of the web page; and classifying the web page based on the stored metadata of the web page.

8. The method as claimed in claim 7, wherein the classifying the web page includes categorizing the web page in a hierarchical structure.

9. The method as claimed in claim 7, wherein the classifying the web page includes categorizing the web page in more than one category.

\* \* \* \* \*